United States Patent
Gerlach et al.

(10) Patent No.: US 8,596,050 B2
(45) Date of Patent: Dec. 3, 2013

(54) SOUND ATTENUATING HEAT EXCHANGER FOR AN INTERNAL COMBUSTION ENGINE

(75) Inventors: David W. Gerlach, Ellington, CT (US); Duane C. McCormick, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 187 days.

(21) Appl. No.: 13/213,938

(22) Filed: Aug. 19, 2011

(65) Prior Publication Data

US 2013/0042600 A1   Feb. 21, 2013

(51) Int. Cl.
  F01N 1/00  (2006.01)

(52) U.S. Cl.
  USPC .......... 60/322; 60/320; 60/321; 165/51; 165/135; 181/212; 181/213; 181/227; 181/228; 181/238

(58) Field of Classification Search
  USPC .......... 181/212, 228, 257, 213, 227, 238; 60/312, 320, 321, 322, 324; 165/51, 165/135
  See application file for complete search history.

(56) References Cited

U.S. PATENT DOCUMENTS

| | | | |
|---|---|---|---|
| 3,235,001 A | 2/1966 | Giannotti | |
| 5,773,770 A * | 6/1998 | Jones | 181/268 |
| 5,808,243 A | 9/1998 | McCormick et al. | |
| 5,828,760 A | 10/1998 | Jacobson et al. | |
| 6,049,615 A | 4/2000 | Chou et al. | |
| 6,379,110 B1 | 4/2002 | McCormick et al. | |
| 6,390,418 B1 | 5/2002 | McCormick et al. | |
| 7,062,921 B2 | 6/2006 | Jeng et al. | |
| 7,389,852 B2 | 6/2008 | Voss et al. | |
| 7,546,898 B2 | 6/2009 | Tracy et al. | |
| 7,610,993 B2 * | 11/2009 | Sullivan | 181/268 |
| 2010/0176592 A1 | 7/2010 | Artes De Arcos Marco | |

FOREIGN PATENT DOCUMENTS

| | | |
|---|---|---|
| GB | 826-054 | 12/1959 |
| JP | H03-114520 | 11/1991 |
| JP | 2000-204941 | 7/2000 |
| JP | 2000265834 A * | 9/2000 |

OTHER PUBLICATIONS

EP search report for EP 1215610 dated Nov. 21, 2012.

* cited by examiner

*Primary Examiner* — Thomas Denion
*Assistant Examiner* — Philip Eklem
(74) *Attorney, Agent, or Firm* — O'Shea Getz P.C.

(57) ABSTRACT

A sound attenuating heat exchanger for an internal combustion engine includes a housing, a barrier wall and a fin. The housing includes an exhaust inlet, an exhaust outlet, a coolant inlet and a coolant outlet. The exhaust inlet is connected to the exhaust outlet by an exhaust flow passage. The coolant inlet is connected to the coolant outlet by a coolant flow passage. The barrier wall fluidly separates the exhaust flow passage from the coolant flow passage. The fin extends from the barrier wall into the exhaust flow passage, and includes a resonator adapted to attenuate sound waves traveling through exhaust gas within the exhaust flow passage. The barrier wall and the fins are adapted to exchange heat energy between the exhaust gas flowing through the exhaust flow passage and coolant flowing through the coolant flow passage.

17 Claims, 4 Drawing Sheets

SOUND ATTENUATING HEAT EXCHANGER FOR AN INTERNAL COMBUSTION ENGINE

This invention was made with government support under Contract No. W909MY-10-C-0013 awarded by the United States Army. The government may have certain rights in the invention.

BACKGROUND OF THE INVENTION

1. Technical Field

This disclosure relates generally to a heat exchanger for an internal combustion engine and, more particularly, to a heat exchanger with one or more integrated Helmholtz resonators.

2. Background Information

A power system can include a reciprocating internal combustion engine, a heat exchanger and a muffler. During operation, exhaust gas output by the engine is directed through the heat exchanger and the muffler. Temperature of the exhaust gas exiting the power system can be lowered by transferring heat energy from the exhaust gas to coolant flowing through the heat exchanger. Engine noise traveling through the exhaust gas can be attenuated with the muffler. Directing the exhaust gas through both the heat exchanger and the muffler, however, can increase exhaust backpressure on the engine, and potentially decrease engine performance.

SUMMARY OF THE DISCLOSURE

According to a first aspect of the invention, a sound attenuating heat exchanger is provided for an internal combustion engine. The heat exchanger includes a housing, a barrier wall and one or more fins. The housing includes an exhaust inlet, an exhaust outlet, a coolant inlet and a coolant outlet. The exhaust inlet is connected to the exhaust outlet by an exhaust flow passage. The coolant inlet is connected to the coolant outlet by a coolant flow passage. The barrier wall fluidly separates the exhaust flow passage from the coolant flow passage. The fins extend from the barrier wall into the exhaust flow passage. Each fin includes one or more Helmholtz resonators that are adapted to attenuate sound waves traveling through exhaust gas within the exhaust flow passage. The barrier wall and the fins are adapted to exchange heat energy between the exhaust gas flowing through the exhaust flow passage and coolant flowing through the coolant flow passage.

According to a second aspect of the invention, a power system is provided that includes a power generator, a refrigeration unit and a sound attenuating heat exchanger. The sound attenuating heat exchanger includes an exhaust flow passage, a coolant flow passage, a barrier wall and one or more fins. The exhaust flow passage is connected to the exhaust outlet of the power generator. The coolant flow passage is connected between a coolant inlet and outlet of the refrigeration unit. The barrier wall fluidly separates the exhaust flow passage from the coolant flow passage. The fins extend from the barrier wall into the exhaust flow passage. Each fin includes one or more Helmholtz resonators that are adapted to attenuate sound waves traveling through exhaust gas within the exhaust flow passage. The barrier wall and the fins are adapted to exchange heat energy between the exhaust gas flowing through the exhaust flow passage and coolant flowing through the coolant flow passage.

The foregoing features and the operation of the invention will become more apparent in light of the following description and the accompanying drawings.

DETAILED DESCRIPTION OF THE INVENTION

Figure 1:
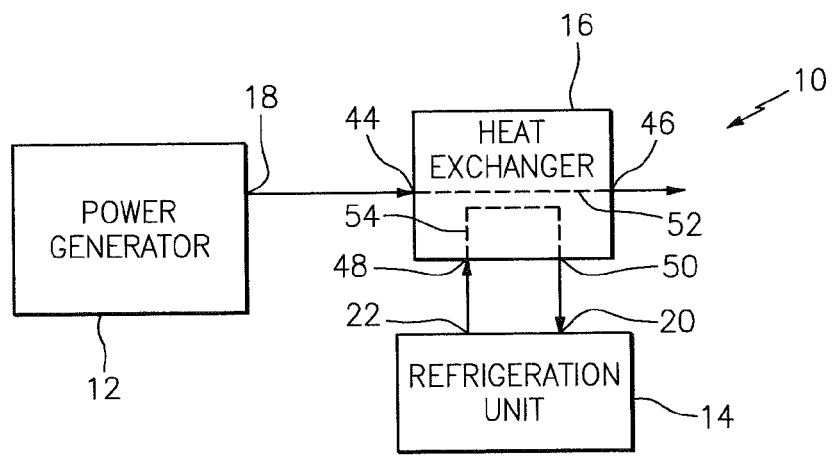
FIG. 1 is a schematic illustration of a power system.

FIG. 1 schematically illustrates a power system 10. The power system 10 includes a power generator 12 (e.g., a reciprocating gasoline or diesel internal combustion engine), a refrigeration unit 14, and a sound attenuating heat exchanger 16.

The power generator 12 includes a power generator exhaust outlet 18.

The refrigeration unit 14 includes a refrigeration unit coolant inlet 20 and a refrigeration unit coolant outlet 22.

Figure 2:
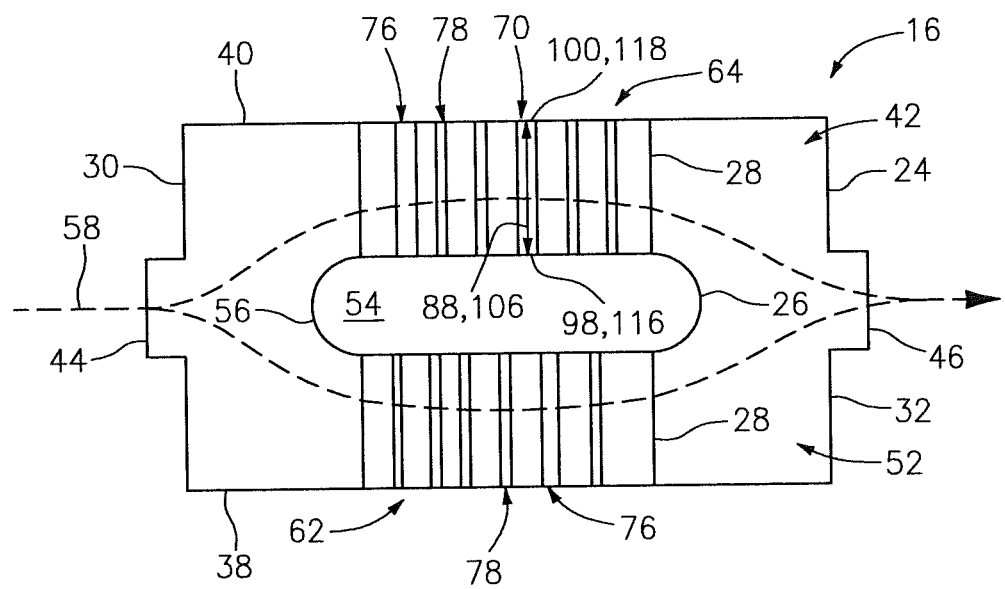
FIG. 2 is a side sectional diagrammatic illustration of a sound attenuating heat exchanger.
Figure 3:
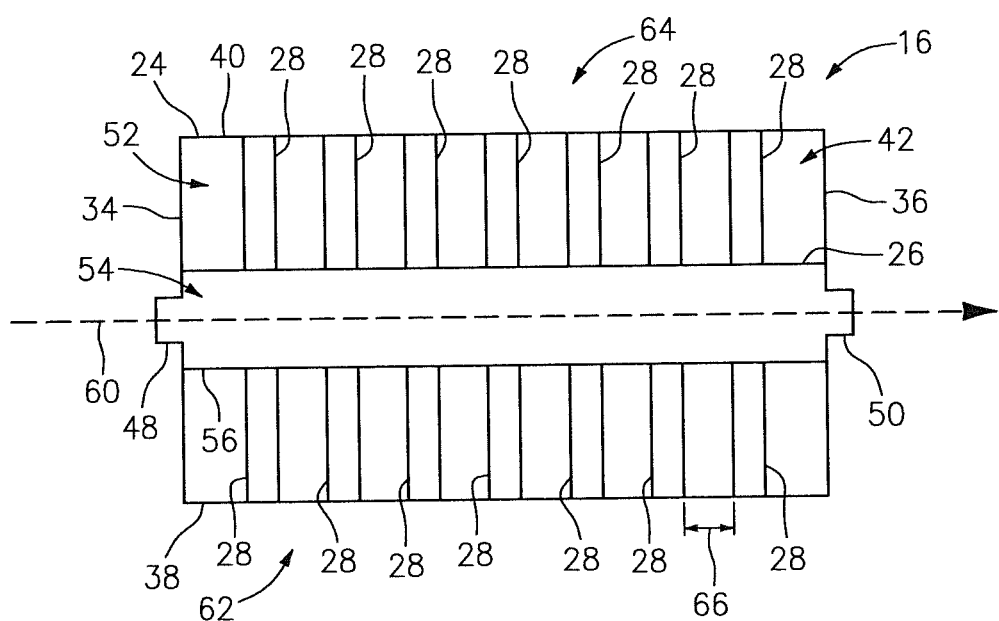
FIG. 3 is a front sectional diagrammatic illustration of the heat exchanger illustrated in FIG. 2.

Referring to FIGS. 2 and 3, the heat exchanger 16 includes a housing 24, a barrier wall 26, and one or more fins 28 (e.g., airfoils).

The housing 24 extends longitudinally between a first end wall 30 and a second end wall 32. The housing 24 extends laterally between a first sidewall 34 and a second sidewall 36. The housing 24 extends vertically between a third sidewall 38 and a fourth sidewall 40. The housing 24 includes an internal housing chamber 42, a housing exhaust inlet 44, a housing exhaust outlet 46, a housing coolant inlet 48 and a housing coolant outlet 50. The exhaust inlet 44 is disposed with the first end wall 30. The exhaust outlet 46 is disposed with the second end wall 32. The coolant inlet 48 is disposed with the first sidewall 34. The coolant outlet 50 is disposed with the second sidewall 36.

Figure 4:
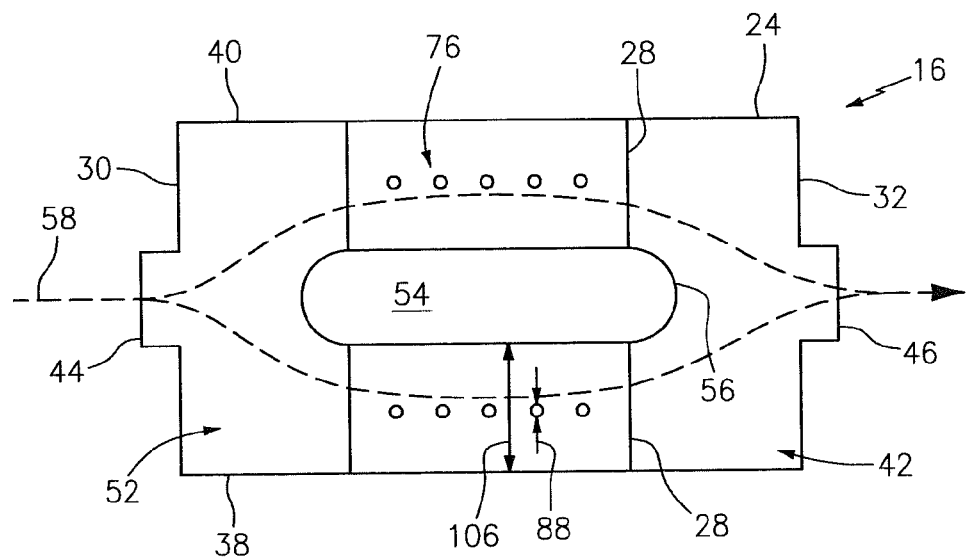
FIG. 4 is a side sectional diagrammatic illustration of another embodiment of a sound attenuating heat exchanger.
Figure 5:
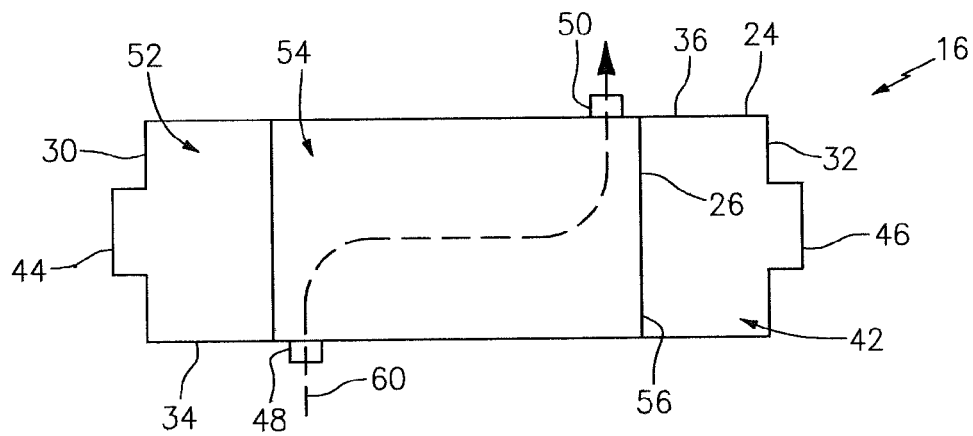
FIG. 5 is a cross-sectional diagrammatic illustration of the heat exchanger illustrated in FIG. 4.

The barrier wall 26 is adapted to fluidly separate the housing chamber 42 into an exhaust flow passage 52 and a coolant flow passage 54. The barrier wall 26, for example, can include a tubular conduit 56 that extends between the first sidewall 34 and the second sidewall 36. The exhaust flow passage 52 extends along a first trajectory 58 between the exhaust inlet 44 and the exhaust outlet 46, for example, outside of the conduit 56. The coolant flow passage 54 extends along a second trajectory 60 between the coolant inlet 48 and the coolant outlet 50, for example, inside of the conduit 56. In some embodiments, the second trajectory 60 is substantially perpendicular to the first trajectory 58. Referring to FIGS. 4 and 5, in other embodiments, the second trajectory 60 is substantially parallel to the first trajectory 58.

Referring again to FIGS. 2 and 3, the fins 28 can be arranged into one or more sets including a first set 62 and a second set 64. The fins 28 in the first set 62 extend between the barrier wall 26 and the third sidewall 38. The fins 28 in the second set 64 extend between the barrier wall 26 and the fourth sidewall 40. Referring to FIG. 3, adjacent fins 28 in each set 62, 64 are separated by a lateral distance 66 to allow airflow therebetween.

Figure 6:
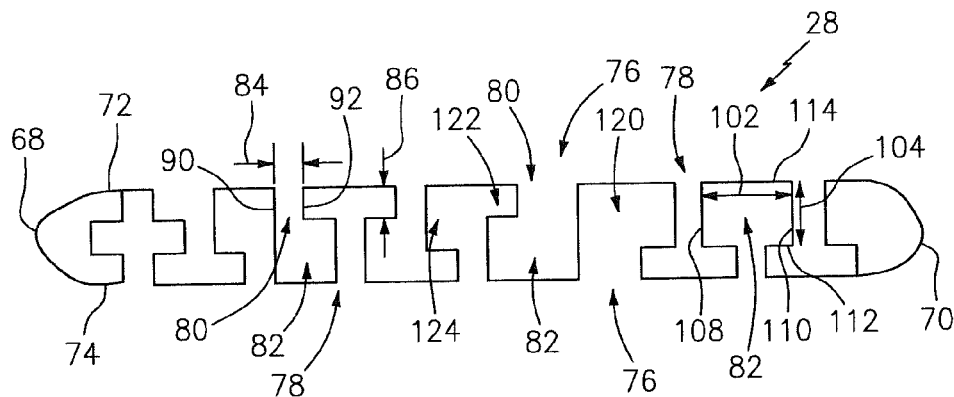
FIG. 6 is a cross-sectional diagrammatic illustration of a fin with a plurality of integrated Helmholtz resonators.

Referring to FIG. 6, each fin 28 includes a leading edge 68, a trailing edge 70, a first longitudinal surface 72, a second longitudinal surface 74, and one or more Helmholtz resonators 76 and 78. The leading and trailing edges 68 and 70 can each have a tapered (e.g., curved) cross-sectional geometry adapted to reduce airflow turbulence around the respective fin 28. The first and second longitudinal surfaces 72 and 74 extend between the leading edge 68 and the trailing edge 70. One or more of the resonators 76 and 78 can be configured into the first longitudinal surface 72, and one or more of the resonators 76 and 78 can be configured into the second longitudinal surface 74.

The resonators 76 and 78 are adapted (e.g., tuned) to attenuate sound waves having one or more predetermined frequencies as a function of one or more tuning parameters. Acoustic frequencies of engine exhaust gas noise produced by the power generator 12 during a certain engine operating point or range are examples of such predetermined frequencies. The tuning parameters can include (i) velocity of exhaust gas flowing through the exhaust flow passage 52, (ii) acoustic frequencies of engine exhaust gas noise traveling through the exhaust flow passage 52, (iii) temperature of the exhaust gas flowing through the exhaust flow passage 52, (iv) temperature of coolant flowing through the coolant flow passage 54, and/or (v) backpressure induced through the exhaust flow passage 52.

In some embodiments, the resonators 76 and 78 are tuned to attenuate acoustic frequencies of engine exhaust gas noise at a plurality of different engine operating points (e.g., a mid-throttle engine operating point, and a full-throttle engine operating point), or across an engine operating range (e.g., between the mid-throttle and the full-throttle engine operating points). The resonators can include, for example, a first resonator 76 and a second resonator 78. The first resonator 76 can be adapted to attenuate sound waves having a first frequency produced, for example, at the mid-throttle engine operating point. The second resonator 78 can be adapted to attenuate sound waves having a second frequency (different than the first frequency) produced, for example, at the full-throttle engine operating point. In alternate embodiments (not shown), the first and second resonators can be configured into different fins.

Each resonator 76, 78 includes a resonator aperture 80 connected to a resonator cavity 82.

Figure 7:
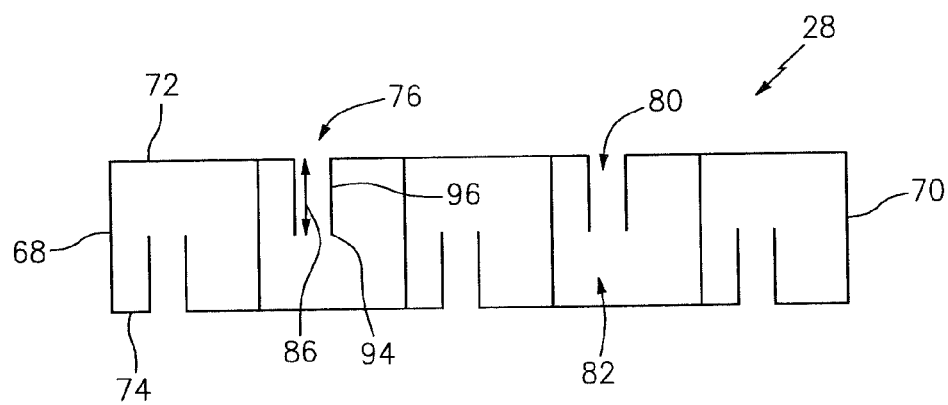
FIG. 7 is a cross-sectional diagrammatic illustration of another embodiment of a fin with a plurality of integrated Helmholtz resonators.

The resonator aperture 80 has an aperture width 84, an aperture length 86, an aperture height 88 (see FIG. 2) and an aperture volume. The aperture width 84 extends between opposing sides 90 and 92 of the resonator aperture 80. The aperture length 86 extends from the respective longitudinal surface 72, 74 to the resonator cavity 82. Alternatively, in the embodiment in FIG. 7, the aperture length 86 extends from the respective longitudinal surface 72, 74 to a conduit end 94 within the resonator cavity 82 where the resonator further includes an extension conduit 96. Referring to FIG. 2, the aperture height 88 extends between opposing sides 98 and 100 of the resonator aperture 80 (e.g., between the barrier wall 26 and the respective housing sidewall 38, 40). In some embodiments, the aperture height 88 is greater than the aperture width 84, thereby providing the resonator aperture 80 with an elongated geometry. Referring to FIG. 4, in other embodiments, the aperture height 88 and the aperture width 84 are substantially equal, thereby providing the resonator aperture 80 with, for example, a circular geometry. The aperture volume is a function of the aperture width 84, the aperture length 86 and the aperture height 88.

Referring again to FIG. 6, the resonator cavity 82 has a cavity width 102, a cavity length 104, a cavity height 106 (see FIG. 2) and a cavity volume. The cavity width 102 extends between opposing sides 108 and 110 of the resonator cavity 82. The cavity width 102 is greater than the aperture width 84. The cavity length 104 extends from a first opposing end 112 (e.g., adjacent the resonator aperture 80) to a second opposing end 114. The cavity length 104 can be greater than, equal to, or less than the aperture width 84. Referring to FIG. 2, the cavity height 106 extends between opposing ends 116 and 118 of the resonator cavity 82 (e.g., between the barrier wall 26 and the respective housing sidewall 38, 40). In some embodiments, the cavity height 106 is approximately equal to the aperture height 88. Referring to FIG. 4, in other embodiments, the cavity height 106 is greater than the aperture height 88. The cavity volume is a function of the cavity width 102, the cavity length 104 and the cavity height 106, and is typically greater than the aperture volume.

Figure 8:
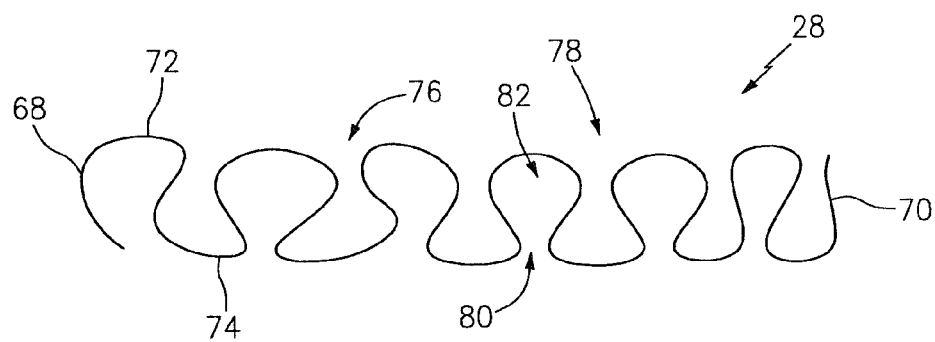
FIG. 8 is a cross-sectional diagrammatic illustration of another embodiment of a fin with a plurality of integrated Helmholtz resonators.

Referring to FIG. 6, the resonator cavity 82 can include a single chamber 120, or a plurality of sub-chambers 122 and 124. Each chamber 120, 122, 124 can include a substantially straight chamber wall and/or a curved chamber wall (see FIG. 8). In some embodiments, the resonator cavity 82 has a substantially symmetrical geometry. In other embodiments, the resonator cavity 82 has an asymmetrical geometry.

Referring to FIG. 1, the power generator exhaust outlet 18 is connected to the housing exhaust inlet 44. The refrigeration unit coolant outlet 22 is connected to the housing coolant inlet 48. The refrigeration unit coolant inlet 20 is connected to the housing coolant outlet 50.

During operation, exhaust gas output from the power generator 12 is directed through the exhaust flow passage 52 before exiting the power system 10. Temperature of the exhaust gas exiting the power system 10 can be lowered by circulating coolant between the refrigeration unit 14 and the heat exchanger 16 and, in particular, directing the coolant through the coolant flow passage 54. For example, referring to FIGS. 2 and 3, heat energy can be transferred from the exhaust gas to the coolant across the fins 28 and the barrier wall 26 where the temperature of the exhaust gas entering the heat exchanger 16 is greater than the temperature of the coolant entering the heat exchanger 16. Referring to FIG. 6, the internal walls of the resonators 76 and 78 increase heat transfer between the exhaust gas and the coolant by providing additional heat transfer surface area to the fins 28. The opposing surfaces 90 and 92 of each resonator aperture 80, in particular, may exhibit relatively high points of heat transfer.

Sound waves (e.g., engine noise) traveling through the exhaust gas can also be attenuated before exiting the power system 10. Each resonator 76, 78 can attenuate a sound wave traveling through the exhaust flow passage 52 having, for example, a frequency that corresponds to the frequency for which the resonator was tuned.

In some embodiments, the heat energy recovered from the exhaust gas (e.g., transferred through the fins 28 and the barrier wall 26 into the coolant) can be used to drive the refrigeration unit 14.

Figure 9:
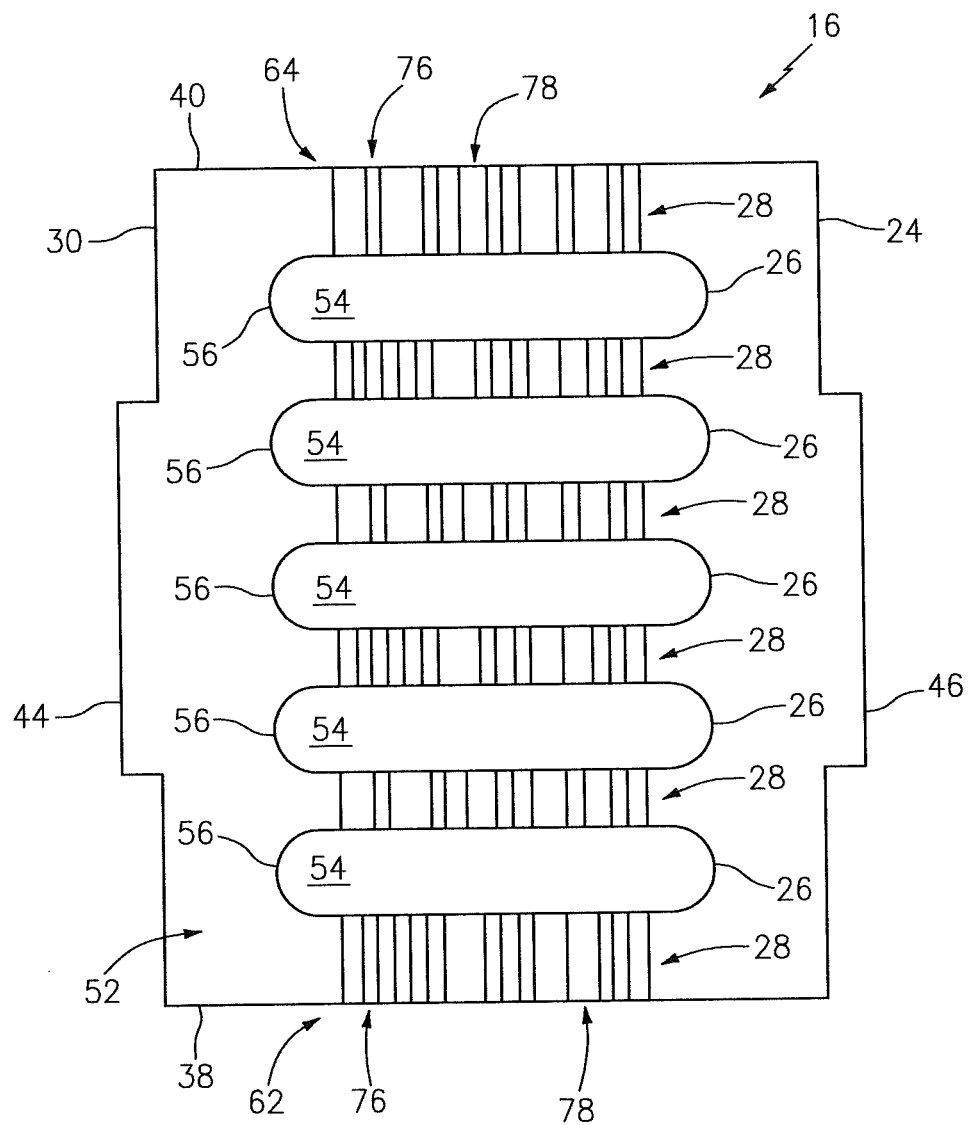
FIG. 9 is a side sectional diagrammatic illustration of another embodiment of a sound attenuating heat exchanger.

FIG. 9 illustrates an alternate embodiment of the heat exchanger 16. In contrast to the embodiments in FIGS. 2 and 4, the heat exchanger in FIG. 9 includes a plurality of the tubular conduits 56, where adjacent tubular conduits 56 can be thermally coupled by respective fins 28 disposed therebetween. The tubular conduits 56 can be arranged into a column as illustrated in FIG. 9. Alternatively, the tubular conduits 56 can be arranged into a variety of other configurations including, for example, a rectangular or staggered array that includes a plurality of columns.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A sound attenuating heat exchanger for an internal combustion engine, comprising:
    a housing including an exhaust inlet, an exhaust outlet, a coolant inlet and a coolant outlet, wherein the exhaust inlet is connected to the exhaust outlet by an exhaust flow passage, and wherein the coolant inlet is connected to the coolant outlet by a coolant flow passage;
    a barrier wall fluidly separating the exhaust flow passage from the coolant flow passage; and
    one or more fins extending from the barrier wall into the exhaust flow passage, each fin including a longitudinal surface that extends from a leading edge to a trailing edge, and each fin including one or more Helmholtz resonators that are adapted to attenuate sound waves traveling through exhaust gas within the exhaust flow passage;
    wherein at least one of the one or more resonators are configured into the longitudinal surface, wherein each resonator comprises a resonator aperture extending from the longitudinal surface to a resonator cavity, and wherein at least one resonator cavity includes a plurality of sub-chambers; and
    wherein the barrier wall and the fins are adapted to exchange heat energy between the exhaust gas flowing through the exhaust flow passage and coolant flowing through the coolant flow passage.

2. The heat exchanger of claim 1, wherein:
    each fin further comprises a second longitudinal surface that extends from the leading edge to the trailing edge; and
    at least some of the resonators are configured into the second longitudinal surface.

3. The heat exchanger of claim 1, wherein each resonator comprises a resonator aperture extending from the longitudinal surface to a resonator cavity.

4. The heat exchanger of claim 3, wherein at least one resonator cavity has a curved chamber wall.

5. The heat exchanger of claim 3, wherein each resonator further comprises an extension conduit that extends the resonator aperture into the resonator cavity.

6. The heat exchanger of claim 3, wherein the resonator aperture has an elongated cross-sectional geometry.

7. The heat exchanger of claim 1, wherein the one or more fins include a first fin and a second fin, wherein at least one of the one or more resonators in the first fin is adapted to attenuate sound waves having a first frequency, and wherein at least one of the one or more resonators in the second fin is adapted to attenuate sound waves having a second frequency that is different than the first frequency.

8. A power system, comprising:
    a power generator including an exhaust outlet;
    a refrigeration unit including a coolant inlet and a coolant outlet; and
    a sound attenuating heat exchanger including:
        an exhaust flow passage connected to the exhaust outlet;
        a coolant flow passage connected between the coolant inlet and the coolant outlet;
        a barrier wall fluidly separating the exhaust flow passage from the coolant flow passage; and
        one or more fins extending from the barrier wall into the exhaust flow passage, each including one or more Helmholtz resonators that are adapted to attenuate sound waves traveling through exhaust gas within the exhaust flow passage;
    wherein the barrier wall and the fins are adapted to exchange heat energy between the exhaust gas flowing through the exhaust flow passage and coolant flowing through the coolant flow passage;
    wherein the resonators include a first resonator and a second resonator, which first resonator is adapted to attenuate sound waves having a first frequency, and which second resonator is adapted to attenuate sound waves having a second frequency that is different than the first frequency.

9. The power system of claim 8, wherein:
    each fin comprises a longitudinal surface that extends from a leading edge to a trailing edge; and
    at least one of the one or more resonators are configured into the longitudinal surface.

10. The power system of claim 9, wherein:
    each fin further comprises a second longitudinal surface that extends from the leading edge to the trailing edge; and
    at least one of the resonators are configured into the second longitudinal surface.

11. The power system of claim 9, wherein each resonator comprises a resonator aperture extending from the longitudinal surface to a resonator cavity.

12. The power system of claim 11, wherein at least one resonator cavity includes a plurality of sub-chambers.

13. The power system of claim 11, wherein at least one resonator cavity has a curved chamber wall.

14. The power system of claim 11, wherein each resonator further comprises an extension conduit that extends the resonator aperture into the resonator cavity.

15. The power system of claim 8, wherein the one or more fins include a first fin and a second fin, wherein at least one of the one or more resonators in the first fin is adapted to attenuate sound waves having a first frequency, and wherein at least one of the one or more resonators in the second fin is adapted to attenuate sound waves having a second frequency that is different than the first frequency.

16. The power system of claim 8, wherein the power generator comprises a reciprocating internal combustion engine.

17. A sound attenuating heat exchanger for an internal combustion engine, comprising:
    a housing including an exhaust inlet, an exhaust outlet, a coolant inlet and a coolant outlet, wherein the exhaust inlet is connected to the exhaust outlet by an exhaust flow passage, and wherein the coolant inlet is connected to the coolant outlet by a coolant flow passage;
    a barrier wall fluidly separating the exhaust flow passage from the coolant flow passage; and
    one or more fins extending from the barrier wall into the exhaust flow passage, each including one or more Helmholtz resonators that are adapted to attenuate sound waves traveling through exhaust gas within the exhaust flow passage;
    wherein the barrier wall and the fins are adapted to exchange heat energy between the exhaust gas flowing through the exhaust flow passage and coolant flowing through the coolant flow passage;
    wherein the resonators include a first resonator and a second resonator, which first resonator is adapted to attenuate sound waves having a first frequency, and which second resonator is adapted to attenuate sound waves having a second frequency that is different than the first frequency.

* * * * *